(12) United States Patent
Yamanaka

(10) Patent No.: US 8,006,799 B2
(45) Date of Patent: Aug. 30, 2011

(54) VEHICLE STEERING SYSTEM

(75) Inventor: Kosuke Yamanaka, Kashihara (JP)

(73) Assignee: JTEKT Corporation, Osaka-shi (JP)

( * ) Notice: Subject to any disclaimer, the term of this patent is extended or adjusted under 35 U.S.C. 154(b) by 205 days.

(21) Appl. No.: 12/514,505

(22) PCT Filed: Nov. 12, 2007

(86) PCT No.: PCT/JP2007/071927
§ 371 (c)(1),
(2), (4) Date: May 12, 2009

(87) PCT Pub. No.: WO2008/059794
PCT Pub. Date: May 22, 2008

(65) Prior Publication Data
US 2010/0288576 A1 Nov. 18, 2010

(30) Foreign Application Priority Data
Nov. 13, 2006 (JP) ................. 2006-306732

(51) Int. Cl.
*B62D 6/00* (2006.01)
(52) U.S. Cl. ....................................... 180/444
(58) Field of Classification Search .......... 180/443–446, 180/417–423
See application file for complete search history.

(56) References Cited

U.S. PATENT DOCUMENTS

| | | | | |
|---|---|---|---|---|
| 3,831,701 A * | 8/1974 | Pilon et al. | ..... | 180/407 |
| 3,983,763 A * | 10/1976 | Adams | ..... | 74/393 |
| 4,739,855 A * | 4/1988 | Miyoshi et al. | ..... | 180/422 |
| 4,751,976 A * | 6/1988 | Higuchi et al. | ..... | 180/446 |
| 6,199,654 B1 * | 3/2001 | Kojo et al. | ..... | 180/443 |
| 6,763,907 B2 * | 7/2004 | Ueno et al. | ..... | 180/444 |
| 7,063,180 B2 * | 6/2006 | Kojima et al. | ..... | 180/444 |
| 7,063,636 B2 * | 6/2006 | Augustine | ..... | 475/3 |
| 7,275,617 B2 * | 10/2007 | Endo et al. | ..... | 180/402 |
| 7,303,045 B2 * | 12/2007 | Yamamori et al. | ..... | 180/444 |
| 7,322,898 B2 * | 1/2008 | Augustine et al. | ..... | 475/19 |
| 7,441,627 B2 * | 10/2008 | Ohta et al. | ..... | 180/446 |
| 7,694,777 B2 * | 4/2010 | Yamashita et al. | ..... | 180/443 |
| 2004/0148078 A1 * | 7/2004 | Nakano et al. | ..... | 701/41 |
| 2006/0183589 A1 | 8/2006 | Naka et al. | | |
| 2008/0264714 A1 * | 10/2008 | Morikawa | ..... | 180/446 |

FOREIGN PATENT DOCUMENTS

| | | |
|---|---|---|
| JP | 61 155265 | 9/1986 |
| JP | 2004 122827 | 4/2004 |
| JP | 2005 343205 | 12/2005 |
| JP | 2005 344757 | 12/2005 |
| JP | 2005 350036 | 12/2005 |
| JP | 2006 168625 | 6/2006 |
| JP | 2006 226375 | 8/2006 |
| JP | 2006 273295 | 10/2006 |

* cited by examiner

*Primary Examiner* — Kevin Hurley
(74) *Attorney, Agent, or Firm* — Oblon, Spivak, McClelland, Maier & Neustadt, L.L.P.

(57) ABSTRACT

A configuration is provided which includes a differential gear-type transfer ratio varying mechanism interposed between an input shaft which rotates as a steering wheel is operated and an output shaft which rotates in conjunction with operation of a steering mechanism for permitting a differential operation between both the shafts, the configuration including a transfer ratio control motor for applying a rotational force to the output shaft, a reaction force control motor for applying a rotational force to the input shaft, and a steering control unit for controlling and driving the transfer ratio control motor to obtain a rotation transfer ratio that is predetermined according to operation of the steering wheel and controlling and driving the reaction force control motor to apply a predetermined reaction force to the steering wheel.

10 Claims, 2 Drawing Sheets

VEHICLE STEERING SYSTEM

TECHNICAL FIELD

The present invention relates to a vehicle steering system having a differential gear-type rotation transfer ratio varying mechanism provided between a steering member such as a steering wheel and a steering mechanism.

BACKGROUND

The steering of a vehicle is performed by transmitting operation of a steering member performed by the driver (in general, rotational operation of a steering wheel) to a steering mechanism disposed at an exterior portion of a passenger compartment so as to turn steered road wheels (in general, left and right front road wheels) by the operation of the steering mechanism. As a steering system for enabling steering like this, there is a vehicle steering system in which a transfer ratio varying mechanism which can vary a rotation transfer ratio is provided in an intermediate position of a steering shaft which connects a steering member and a steering mechanism together, and the transmission of rotation from the steering member to the steering mechanism is made to be implemented by varying the rotation transfer ratio in a stepless fashion (for example, refer to JP-A-2005-344757).

The transfer ratio varying mechanism described in JP-A-2005-344757 is a differential gear mechanism which has an input sun gear which is provided circumferentially on an input shape lying on the steering member side, an output sun gear disposed on the same axis as the input sun gear, an input planetary gear and an output planetary gear which mesh with the input sun gear and the output sun gear, respectively, and a carrier which supports these planetary gears via a common shaft, and the transfer ratio varying mechanism includes a transfer ratio control motor for causing the carrier to rotate around the axis.

According to this configuration, when the carrier is caused to rotate by driving the transfer ratio control motor, rotation of the input shaft that is inputted into the input sun gear is transmitted to the output sun gear and the output shaft via the input planetary gear and the output planetary gear which rotate on their own axes while rotating together with the carrier, and the rotation transfer ratio between the input and output shafts can be varied in a stepless fashion in accordance with an increase or decrease in the rotational speed of the carrier which is driven by the transfer ratio control motor. The transfer ratio control motor can also be used as a means for applying steering effort to the steering mechanism and is used to correct steering to eliminate an unstable steering condition attributed to lateral wind acting on a running vehicle or slippage of the road wheel/s on the road surface by allowing the transfer ratio control motor to operate irrespective of the operation of the steering member.

DISCLOSURE OF THE INVENTION

Problem that the Invention is to Solve

The steering system disclosed in JP-A-2005-344757 includes a reaction force control motor for applying a rational force to the input shaft in order to compensate for a change in reaction force which is fed back to the steering member in association with a change in rotation transfer ratio due to the drive of the transfer ratio control motor. However, since, when the transfer ratio control motor is driven, part of the rotational force of the motor is transmitted to the input shaft via the carrier, there is caused a problem that the control of the reaction force control motor becomes complex due to the compensation of reaction force.

The invention has been made in view of the situations, and an object thereof is to provide a vehicle steering system which can implement a change in rotational transfer ratio between an input shaft lying on a steering member side and an output shaft lying on a steering mechanism side without triggering the transmission of force to the input shaft side and enable a simple control of a reaction force control motor.

Means for Solving the Problem

According to an aspect of the invention, there is provided a vehicle steering system comprising a differential gear-type transfer ratio varying mechanism disposed between an input shaft which rotates as a steering member is operated and an output shaft which rotates in conjunction with operation of a steering mechanism for varying a rotation transfer ratio between both the shafts, characterized by comprising a transfer ratio control motor for applying a rotational force to the output shaft, a reaction force control motor for applying a rotational force to the input shaft, and a control means for controlling and driving the transfer ratio control motor to obtain a rotation transfer ratio that is predetermined according to operation of the steering member and controlling and driving the reaction force control motor to apply a predetermined reaction force to the steering member.

Advantage of the Invention

In the vehicle steering system according to an aspect of the invention, since rotation of the transfer ratio control motor is transmitted to the output shaft on the steering mechanism side to vary the rotation transfer ratio, the transmission of rotation to the input shaft by the transfer ratio control motor is absorbed by the action of the differential gear-type transfer ratio varying mechanism, the effect on the control of the reaction force control motor which applies a reaction force to the steering member via the input shaft can be eliminated, thereby making it possible to maintain a good steering feeling by applying an appropriate reaction force by a simple control of the reaction force control motor.

BEST MODE FOR CARRYING OUT THE INVENTION

Figure 1:
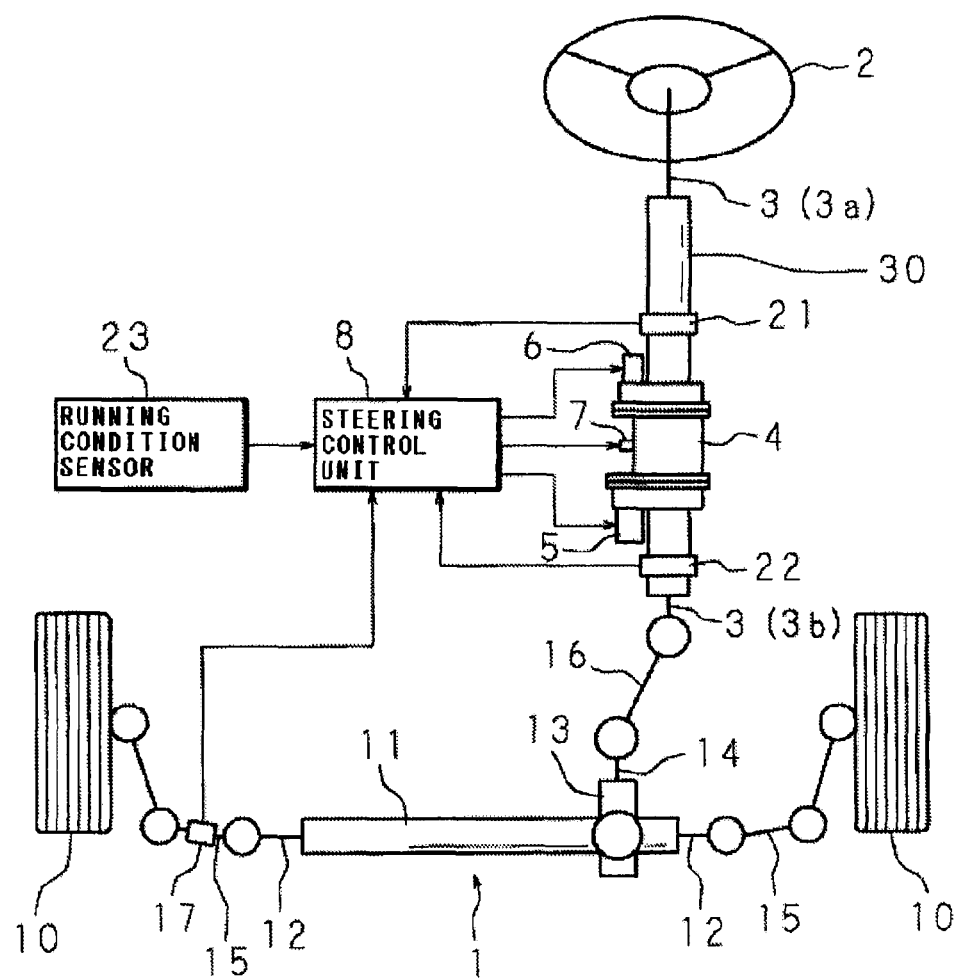
FIG. 1 is an exemplary diagram showing an overall configuration of a vehicle steering system according to the invention.

Hereinafter, an embodiment of the invention will be described in detail with reference to the drawings. FIG. 1 is an exemplary diagram showing an overall configuration of a vehicle steering system according to the invention. The vehicle steering system according to the invention includes a steering mechanism 1 for turning steered road wheels 10 disposed on the left and right of a vehicle body and a steering wheel (a steering member) 2 which is operated to be turned for steering and is made to turn the steered road wheels 10 by the operation of the steering mechanism 1 according to the operation of the steering wheel, which will be described later, to thereby realize steering according to the operation of the steering wheel 2.

The steering mechanism 1 is a known rack-and-pinion steering mechanism which includes a rack shaft 12 which is supported so as to move in an axially longitudinal direction in an interior of a cylindrical rack housing 11 provided to extend in a transverse direction of the vehicle body, not shown, and a pinion shaft 14 which is supported rotatably in an interior of a pinion housing 13 which intersects an intermediate position of the rack housing 11.

Ends of the rack shaft 12 which project outwards from ends of the rack housing 11 are connected to the left and right steered road wheels 10 via separate tie rods 15, respectively. In addition, an upper end of the pinion shaft 14 which projects from an upper portion of the pinion housing 13 is connected to the steering shaft 3 via an intermediate shaft 16. A pinion, not shown, is provided at a lower half portion of the pinion shaft 14 which extends into the interior of the pinion housing 13 so as to be brought into meshing engagement with a rack formed over an appropriate length on an outer surface of the rack shaft 12 in the intersecting portion with the rack housing 11.

The steering shaft 3 is supported rotatably in an interior of a column housing 30 and is attached in place in an interior of a passenger compartment, not shown, while holding an inclined posture in which the front is placed downwards. The steering shaft 3 is divided into two shafts, an upper input shaft 3a and a lower output shaft 3b (refer to FIG. 2) in the interior of the column housing 30, and the steering wheel 2 is fixedly provided at a projecting end of the steering shaft 3 (the input shaft 3a) which projects upwards of the column housing 30, while a projecting end of the steering shaft 3 (the output shaft 3b) which projects downwards of the same is connected to the pinion shaft 14 in the way described above.

Figure 2:
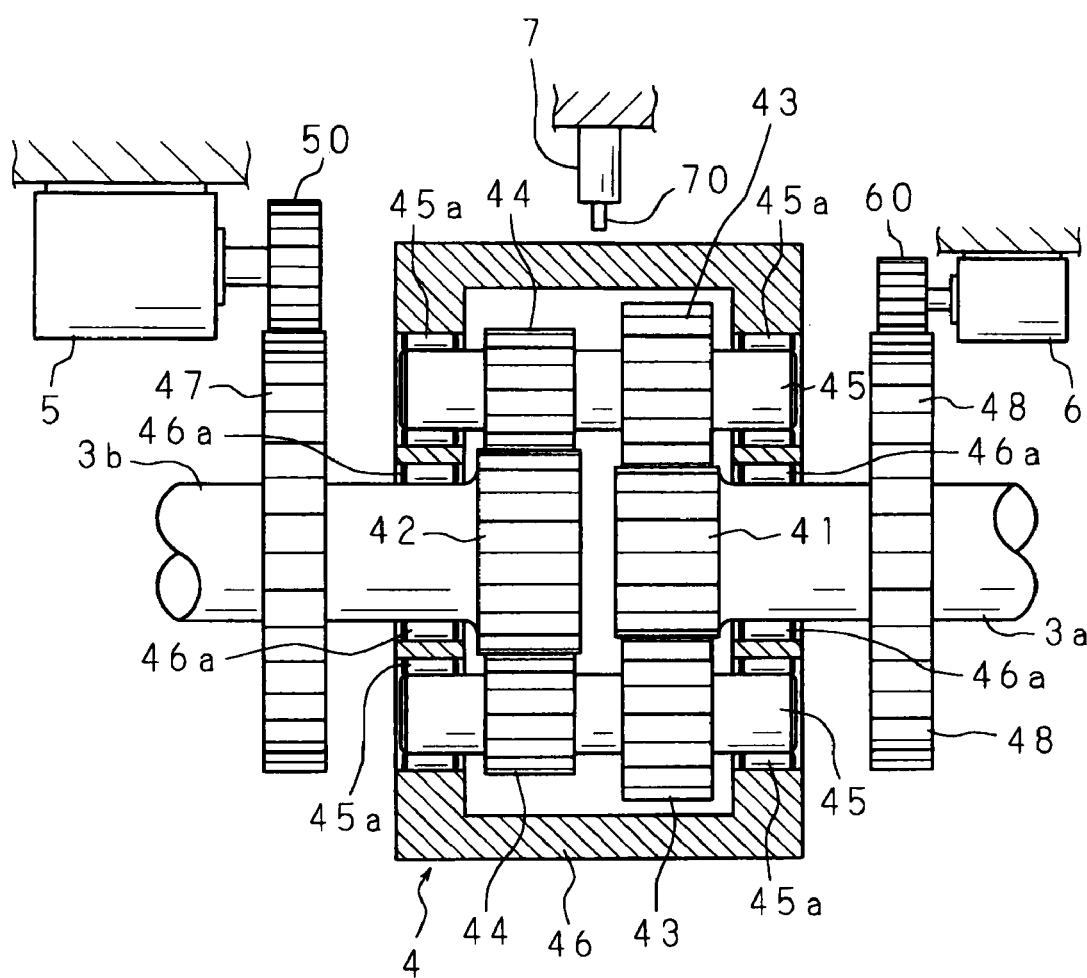
FIG. 2 is a vertical sectional view showing schematically the configuration of a transfer ratio varying mechanism.

A transfer ratio varying mechanism 4, which is configured as a differential gear mechanism, is provided at an intermediate portion of the steering shaft 3. FIG. 2 is a vertical sectional view showing schematically the configuration of the transfer ratio varying mechanism 4. As is shown in the same figure, the input shaft 3a and the output shaft 3b, which make up the steering shaft 3, are supported rotatably on the same axis with distal ends thereof being brought into abutment with each other, and an input sun gear 41 and an output sun gear 42 are formed integrally at end portions of both the shafts 3a, 3b which are in abutment with each other, respectively. As is shown in the figure, there is a predetermined difference in outside diameter between the input sun gear 41 and the output sun gear 42, and the numbers of teeth which are provided on outer circumferences of the input sun gear 41 and the output sun gear 42 are made to differ.

Two input planetary gears 43 are brought into meshing engagement with the input sun gear 41 in diametrically confronting positions, and two output planetary gears 44 are brought into meshing engagement with the output sun gear 42 in similar positions. The input planetary gear 43 and the output planetary gear 44 which are brought into meshing engagement with the similar positions are provided circumferentially on an outer circumference of a common shaft 45 and are supported in an interior of a cylindrical carrier 46 via this shaft 45. Support holes in the carrier 46 which penetrate through axis centers of both end walls thereof are fitted on the input shaft 3a and the output shaft 3b, respectively, so that the carrier 46 is supported on both the shafts 3a, 3b in such a manner as to rotate relative thereto on the same axis.

In the illustrated transfer ratio varying mechanism 4, shell-less needle bearings are used as bearings 45a, for supporting both ends of the shafts 45 supporting the input planetary gears 43 and the output planetary gears 44 on the carrier 46 and bearings 46a, 46b which support the carrier 46 on the input shaft 3a and the output shaft 3b.

A needle bearing is a rolling bearing having a plurality of needle-shaped rolling elements which are aligned in a circumferential direction and its size in a radial direction is made smaller than a ball bearing including spherical rolling elements. Consequently, supporting positions of the shafts 45 by the bearings can be made closer to the input shaft 3a and the output shaft 3b so as to reduce an outside diameter of the carrier 46, which can contribute to a reduction in size of the transfer ratio varying mechanism 4. Further, the shell-less needle bearings are mounted in such a manner that needles are brought into direct rolling contact with inner and outer supporting surfaces, and this obviates the necessity of fixing of the bearings through press fitting. Consequently, there is caused no fear that a strain is generated in the support holes in the carrier 46 in association with press fitting of the bearings thereinto, the necessity of increasing the thickness and diameter of the carrier 46 to ensure the strength thereof being thereby obviated.

A transmission gear 47 is fixedly and securely fitted on the output shaft 3b of the transfer ratio varying mechanism 4 which is configured in the way described above. This transmission gear 47 is brought into meshing engagement with an output gear 50 of a transfer ratio control motor 5, so that when the transfer ratio control motor 5 is driven to rotate, a rotational force is made to be applied to the output shaft 3b via the output gear 50 and the transmission gear 47.

As has been described before, the output shaft 3b is connected to the pinion shaft 14 of the steering mechanism 1 via the intermediate shaft 16, and rotation of the output shaft 3b is transmitted to the pinion shaft 14, so as to rotate the pinion shaft 14. The rotation of the pinion shaft 14 is transformed into a different type of motion at the meshing portion between the pinion and the rack to thereby be transmitted to the rack shaft 12, which is then moved in the axially longitudinal direction. The left and right steered road wheels 10, are pushed and pulled by the movement of the rack shaft 12 via the separate tie rods 15, whereby the steered road wheels 10 are turned accordingly. In this way, in the vehicle steering system according to the invention, steering is executed according to the rotational direction and rotational amount of the transfer ratio control motor 5.

On the other hand, a reaction force gear 48 is fixedly and securely fitted on the input shaft 3a of the transfer ratio varying mechanism 4, and this reaction force gear 48 is brought into meshing engagement with an output gear 60 of a reaction force control motor 6. When the reaction force control motor 6 is driven to rotate, a rotational force is applied to the input shaft 3a via the reaction force gear 48 which meshes with the output gear 60, and this rotational force is additionally imparted to the steering wheel 2 which is secured to the upper end of the input shaft 3a. In the vehicle steering system according to the invention, the steering wheel 2 as the steering member is operated against a reaction force applied to the input shaft 3a by the reaction force control motor 3a.

When the steering wheel 2 is operated to be turned, the input sun gear 41 provided at a lower end portion of the input shaft 3a rotates, and when the transfer ratio control motor 5 is driven to rotate, the output sun gear 42 provided at an upper end portion of the output shaft 3b rotates. The input planetary gears 43 mesh with the input sun gear 41, while the output planetary gears 44 mesh with the output sun gear 42. Although these planetary gears 43 and 44 rotate in conjunction with rotation of the input shaft 3a and the output shaft 3b, the planetary gears 43 and 44 are supported on the carrier 46 which can rotate relative to the input shaft 3a and the output shaft 3b on the same axis, and a difference in rotational speed between the input sun gear 41 and the output sun gear 42 is absorbed by the rotation (rotation on its own axis) of the carrier 46 which is generated in association with the rotation (around the corresponding sun gears) of the input planetary gears 43 and the output planetary gears 44, whereby the input shaft 3a and the output shaft 3b can rotate independently of each other.

Consequently, the steering that is implemented according to the rotational drive of the transfer control motor 5 can be executed by varying the ratio appropriately relative to the operation amount of the steering wheel as the steering member. In addition, since the rotational force of the transfer ratio control motor 5 is applied to the output shaft 3b of the transfer ratio varying mechanism 4 and no rotational force is fed back to the input shaft of the transfer ratio varying mechanism 4, the steering wheel 2 can be operated against only the force generated by the reaction force control motor 6.

The transfer ratio varying mechanism 4 that is configured in the way described heretofore includes a lock means 7 which restricts a differential operation between the input shaft 3a and the output shaft 3b. The illustrated lock means 7 is a solenoid disposed in such a manner as to confront an outer surface of the carrier 46 and is made to restrict the rotation of the carrier 46 by pressing a distal end of an output rod 70 which projects in response to excitation against the outer circumferential surface of the carrier 46. In addition, the lock means 7 can adopt an appropriate configuration, provided that the configuration can restrict the rotation of the carrier 46.

When the steering wheel 2 is operated to be turned in such a state that the rotation of the carrier 46 is restricted by the lock means 7 that is configured as has been described above, the input shaft 3a which is connected to the steering wheel 2 rotates, and the input sun gear 41 of the transfer ratio varying mechanism 4 rotates. By this rotation, the input planetary gears 43, 43 which mesh with the input sun gear 41 rotate together with the output planetary sun gears 44 which share the shafts 45, and by this rotation, the rotational force is applied to the output sun gear 42 which meshes with the output planetary gears 44. This rotates the output shaft 3b which includes the output sun gear 42, whereby steering is implemented by the operation of the steering mechanism 1 according to the rotation of the output shaft 3b.

As this occurs, the transmission of rotation from the input shaft 3a to the output shaft 3b is implemented at an intrinsic rotation transfer ratio which is determined by the numbers of teeth of the input sun gear 41, the input and output planetary gears 43, 44 and the output sun gear 42, and the steered road wheels 10, 10 are turned in the operating direction of the steering wheel 2 by an amount corresponding to an angle (tuning angle) resulting from multiplying the operation amount (steering angle) of the steering wheel 2 by a rotation transfer ratio, whereby steering is implemented based on a mechanical transmission from the steering wheel 2 to the steering mechanism 1.

As is shown in FIG. 1, the transfer ratio control motor 5 and the reaction force control motor 6 are added to the transfer ratio varying mechanism 4 which is interposed in the intermediate position of the column housing 30, and these transfer ratio control motor 5 and reaction force control motor 6 are made to be driven to rotate in response to operation commands given to drive circuits, not shown, from a steering control unit 8 which is made up of a microprocessor. An operation command is also given to an excitation circuit of the lock means 7 which is made up of the solenoid by the steering control unit 8, whereby the lock means 7 operates in the way described above in response to the operation command given from the steering control unit 8, so as to restrict the rotation of the carrier 46.

A result of a detection by an input rotation angle sensor 21 for detecting a rotation angle of a position on the steering shaft 3 which lies upper than the transfer ratio varying mechanism 4, that is, the input shaft 3a and a result of a detection by an output rotational angle sensor 22 for detecting a rotational angle of a position on the steering shaft 3 which lies lower than the transfer ratio varying mechanism 4, that is, the output shaft 3b are given to the steering control unit 8. The detection result of the input rotation sensor 21 corresponds to an operating angle (a steering angle) of the steering wheel 2, and the detection result of the output rotation angle sensor 22 corresponds to a turning angle that actually occurs (an actually turned angle) of the steered road wheels 10.

In addition, a result of a detection by a tie rod axial force sensor 17 is given to the steering control unit 8 which tie rod axial force sensor 17 is added to the tie rod 15 which connects the rack shaft 12 to the road wheel 10 for detecting an axial force acting axially on the tie rod 15. This detection result is used as a signal signaling a steering reaction force that is actually applied to the steering mechanism 1 in association with steering (an actual reaction force). Further, results of detections of running conditions which affect steering by running condition sensors 23 which are installed at respective portions of the vehicle are given to the steering control unit 8 from the running condition sensors 23.

To enable a steering according to a rotational operation of the steering wheel 2, the steering control unit 8 outputs an operation command to the transfer ratio control motor 5 to perform a transfer ratio control operation for driving to rotate the transfer ratio control motor 5. This transfer ratio control operation is implemented by, for example, applying a steering angle of the steering wheel 2 that is detected by the input rotation angle sensor 21 to a predetermined control map so as to obtain a target transfer ratio and controlling the transfer ratio control motor 5 to be driven so as to obtain the target transfer ratio. As this occurs, the detection result of the output rotation angle sensor 22 is used as feedback information indicating an actual turned angle of the left and right steered road wheels 10. In addition, running conditions detected by the running condition sensors 23 are used to select a control map to give the target transfer ratio.

In addition, to apply a reaction force according to a steering angle to the steering wheel 2, the steering control unit 8 outputs an operation command to the reaction force control motor 6 so as to perform a reaction force control operation to drive to rotate the reaction force control motor 6. This reaction force control operation is implemented by obtaining a target reaction force according to a predetermined control map and outputting an operation command to the reaction force control motor 6 to generate the target reaction force. As this occurs, the detection result of the tie rod axial force detection sensor 17 is used as feedback information indicating an actual reaction force applied to the steering mechanism 1. In addition, the running conditions detected by the running condition sensors 23 are used to select a control map to give the target reaction force.

In addition, the reaction force control operation carried on the reaction force control motor 6 is implemented by detecting an operation torque applied to the steering wheel 2 and performing a feedback control based on a difference between the detection result and the target reaction force. The operation torque can be obtained from, for example, the result of a detection of a rotation torque of the input shaft 3a by a torque sensor (not shown) which is provided in parallel to the input rotation angle detection sensor 21.

The rotational force of the reaction force control motor 6 that is applied to the input shaft 3a is added to the steering wheel 2 as a steering reaction force by the reaction force control operation. This steering reaction force is determined according to a control map that is selected in accordance with a running condition such as vehicle speed, whereby the driver who is operating the steering wheel 2 is allowed to sense a good steering feeling.

Although the steering is performed under the rotational transfer ratio which is determined according to the rotational drive of the transfer ratio control motor 5 during this reaction force control operation, the rotational force applied to the output shaft 3b by the transfer ratio control motor 5 is absorbed by the transfer ratio varying mechanism 4 in the way described above, and no reaction force is exerted on the input shaft 3a. Therefore, the steering wheel 2 can be operated against only the reaction force of the reaction force control motor 6. Consequently, the reaction force control operation by the steering control unit 8 which is aimed to the reaction force control motor 6 can be implemented without considering the deterioration of steering feeling due to the effect of the transfer ration control operation which is aimed to the transfer ratio control motor 5, thereby making it possible to realize a good steering feeling by the simple control.

In the midst of performing the steering control and reaction force control operations, the steering control unit 8 is carrying out an abnormality diagnosis for identifying the occurrence of a failure in the respective sensors on the input side and the transfer ratio control motor 5 and the reaction force control motor 6, and in the event that the result of the diagnosis determines that a failure occurs, the steering control unit 8 stops the erroneous steering control and reaction force control in the condition where the failure occurs and performs a fail-safe operation in which an operation command is issued to the lock means 7 of the transfer ratio varying mechanism 4.

The output rod 70 of the lock means 7 which is configured as the solenoid as has been described above projects in the fail-safe operation so as to be pressed against the outer circumferential surface of the carrier 46 of the transfer ratio varying mechanism 4 to thereby restrict the rotation of the carrier 46, whereby the turning operation of the steering wheel 2 as the steering member is transmitted to the steering mechanism 1 through a speed reduction by the transfer ratio varying mechanism 4 by the restriction. Consequently, an emergency steering that is to be carried out when the steering control and the reaction force control are stopped in association with the occurrence of the failure can be made to be performed by manual steering through a mechanical transmission from the steering wheel 2 to the steering mechanism 1.

As this occurs, although the lock means 7 restricts the rotation of the carrier 46 of the transfer ratio varying mechanism 4, a large force is necessary to restrict the rotation of the carrier 46, and a small and simply configured actuator such as the solenoid described above can be used as the lock means 7. For example, the restriction of rotation of the carrier 46 can be realized in an ensured fashion by causing the distal end of the output rod 70 to be pressed against the outer circumferential surface of the carrier 64 which forms a large diameter cylindrical shape via a friction plate made of a high friction material such as a rubber without needing a complex configuration.

In addition, since, when the steering is shifted to the manual steering by the fail-safe operation that has been described above, the steering feel that is sensed by the driver who is operating the steering wheel 2 changes, the steering control unit 8 desirably activates a warning operation such as making a warning sound or generation of a voice message while outputting the operation command to the lock means 7 so as to inform the driver of the change in steering feel.

Additionally, One or both of the transfer ratio control motor 5 and the reaction force control motor 6 may be made up of a direct drive motor, so as to transmit the rotational force directly to the input shaft 3a and the output shaft 3b which correspond to the transfer control motor 5 and the reaction force control motor 6, respectively.

The invention claimed is:

1. A vehicle steering system comprising:
    an input shaft that rotates according to an operation of a steering member;
    an output shaft that rotates in conjunction with operation of a steering mechanism;
    a differential gear-type transfer ratio varying mechanism disposed between the input shaft and the output shaft for varying a rotation transfer ratio between the input and output shafts;
    a transfer ratio control motor having a rotational output element configured to engage a part fixed to the output shaft, so as to apply a rotational force to the output shaft;
    a reaction force control motor for applying a rotational force to the input shaft; and
    a controller for controlling and driving the transfer ratio control motor to obtain a predetermined rotation transfer ratio according to operation of the steering member and controlling and driving the reaction force control motor to apply a predetermined reaction force to the steering member.

2. The vehicle steering system according to claim 1, wherein the transfer ratio varying mechanism comprises an input sun gear which is formed on the input shaft, an output sun gear which is formed on the output shaft, a shaft on which an input planetary gear and an output planetary gear which are made to mesh with the input sun gear and the output sun gear, respectively, are formed and a carrier which supports the input shaft and is supported rotatably on the output shaft.

3. A vehicle steering system comprising:
    an input shaft that rotates according to an operation of a steering member;
    an output shaft that rotates in conjunction with operation of a steering mechanism;
    a differential gear-type transfer ratio varying mechanism disposed between the input shaft and the output shaft for varying a rotation transfer ratio between the input and output shafts;
    a transfer ratio control motor for applying a rotational force to the output shaft;
    a reaction force control motor for applying a rotational force to the input shaft; and
    a controller for controlling and driving the transfer ratio control motor to obtain a predetermined rotation transfer ratio according to operation of the steering member and controlling and driving the reaction force control motor to apply a predetermined reaction force to the steering member,
    wherein the transfer ratio varying mechanism comprises an input sun gear which is formed on the input shaft, an output sun gear which is formed on the output shaft, a shaft on which an input planetary gear and an output planetary gear which are made to mesh with the input sun gear and the output sun gear, respectively, are formed and a carrier which supports the input shaft and is supported rotatably on the output shaft, wherein the input shaft includes a gear meshing with an output gear of the reaction force control motor, and the output shaft includes a gear meshing with an output gear of the transfer ratio control motor.

4. A vehicle steering system comprising:
an input shaft that rotates according to an operation of a steering member;
an output shaft that rotates in conjunction with operation of a steering mechanism;
a differential gear-type transfer ratio varying mechanism disposed between the input shaft and the output shaft for varying a rotation transfer ratio between the input and output shafts;
a transfer ratio control motor for applying a rotational force to the output shaft;
a reaction force control motor for applying a rotational force to the input shaft; and
a controller for controlling and driving the transfer ratio control motor to obtain a predetermined rotation transfer ratio according to operation of the steering member and controlling and driving the reaction force control motor to apply a predetermined reaction force to the steering member,
wherein the transfer ratio varying mechanism comprises an input sun gear which is formed on the input shaft, an output sun gear which is formed on the output shaft, a shaft on which an input planetary gear and an output planetary gear which are made to mesh with the input sun gear and the output sun gear, respectively, are formed and a carrier which supports the input shaft and is supported rotatably on the output shaft,
further comprising a lock unit for selectively restricting the rotation of the carrier, wherein when the lock unit does not restrict the rotation of the carrier, rotation of the input shaft is not transferred to the output shaft, and when the lock unit restricts the rotation of the carrier, rotation of the input shaft is transferred to the output shaft.

5. The vehicle steering system according to claim 4, wherein the controller investigates the occurrence of failure of the transfer ratio control motor and the reaction force control motor, and when the controller determines that a fail-safe operation occurs, the lock unit restricts the rotation of the carrier.

6. The vehicle steering system according to claim 1, wherein the transfer ratio control motor is added to and provided on the transfer ratio varying mechanism.

7. The vehicle steering system according to claim 6, wherein the transfer ratio varying mechanism comprises an input sun gear that is formed on the input shaft, an output sun gear that is formed on the output shaft, a shaft on which an input planetary gear and an output planetary gear that are made to mesh with the input sun gear and the output sun gear, respectively, are formed and a carrier that supports the input shaft and is supported rotatably on the output shaft.

8. A vehicle steering system comprising:
an input shaft that rotates according to an operation of a steering member;
an output shaft that rotates in conjunction with operation of a steering mechanism;
a differential gear-type transfer ratio varying mechanism disposed between the input shaft and the output shaft for varying a rotation transfer ratio between the input and output shafts;
a transfer ratio control motor for applying a rotational force to the output shaft;
a reaction force control motor for applying a rotational force to the input shaft; and
a controller for controlling and driving the transfer ratio control motor to obtain a predetermined rotation transfer ratio according to operation of the steering member and controlling and driving the reaction force control motor to apply a predetermined reaction force to the steering member,
wherein the transfer ratio control motor is added to and provided on the transfer ratio varying mechanism, and wherein the transfer ratio varying mechanism comprises an input sun gear that is formed on the input shaft, an output sun gear that is formed on the output shaft, a shaft on which an input planetary gear and an output planetary gear that are made to mesh with the input sun gear and the output sun gear, respectively, are formed and a carrier that supports the input shaft and is supported rotatably on the output shaft,
wherein the input shaft includes a gear meshing with an output gear of the reaction force control motor, and the output shaft includes a gear meshing with an output gear of the transfer ratio control motor.

9. A vehicle steering system comprising:
an input shaft that rotates according to an operation of a steering member;
an output shaft that rotates in conjunction with operation of a steering mechanism;
a differential gear-type transfer ratio varying mechanism disposed between the input shaft and the output shaft for varying a rotation transfer ratio between the input and output shafts;
a transfer ratio control motor for applying a rotational force to the output shaft;
a reaction force control motor for applying a rotational force to the input shaft; and
a controller for controlling and driving the transfer ratio control motor to obtain a predetermined rotation transfer ratio according to operation of the steering member and controlling and driving the reaction force control motor to apply a predetermined reaction force to the steering member,
wherein the transfer ratio control motor is added to and provided on the transfer ratio varying mechanism, and wherein the transfer ratio varying mechanism comprises an input sun gear that is formed on the input shaft, an output sun gear that is formed on the output shaft, a shaft on which an input planetary gear and an output planetary gear that are made to mesh with the input sun gear and the output sun gear, respectively, are formed and a carrier that supports the input shaft and is supported rotatably on the output shaft,
further comprising a lock unit for selectively restricting the rotation of the carrier, wherein when the lock unit does not restrict the rotation of the carrier, rotation of the input shaft is not transferred to the output shaft, and when the lock unit restricts the rotation of the carrier, rotation of the input shaft is transferred to the output shaft.

10. The vehicle steering system according to claim 5, wherein the controller investigates the occurrence of failure of the transfer ratio control motor and the reaction force control motor, and when the controller determines that a fail-safe operation occurs, the lock unit restricts the rotation of the carrier.

* * * * *